United States Patent [19]

Maitan et al.

[11] Patent Number: 5,762,742

[45] Date of Patent: Jun. 9, 1998

[54] PROCESS FOR THE EMBELLISHMENT OF SKINS AND INSTALLATION FOR CARRYING OUT THE PROCESS

[75] Inventors: Gianni Maitan, Vicenza; Giacomino Adolfo Agosti, Castelgomberto, both of Italy

[73] Assignees: GE.MA.TA. Spa; GIDUE SRL, both of Vicenza, Italy

[21] Appl. No.: 635,440

[22] Filed: Apr. 17, 1996

[30] Foreign Application Priority Data

Apr. 27, 1995 [IT] Italy .................. VI95 A 0068

[51] Int. Cl.$^6$ .................. B32B 31/10; B32B 31/20; B32B 35/00
[52] U.S. Cl. .................. 156/219; 156/246; 156/302; 156/552; 156/578
[58] Field of Search .................. 156/246, 247, 156/302, 552, 560, 578, 219; 427/207.1, 428; 118/244, 258

[56] References Cited

U.S. PATENT DOCUMENTS

| 3,713,938 | 1/1973 | Sutton | 156/247 X |
| 4,218,505 | 8/1980 | Shiga et al. | |
| 5,352,322 | 10/1994 | Leverick | 156/578 |

*Primary Examiner*—Curtis Mayes
*Attorney, Agent, or Firm*—Bucknam and Archer

[57] ABSTRACT

The process for the embellishment of skins (91) comprises the following operations: application of an embellishing film (6) on a support belt (4); drying the embellishing film; coupling the skins (91) to the embellishing film after addition of a gluing material; applying pressure to the skins (91) and to the embellishing film (6); separating the skins (91) together with the embellishing film (6) which have been glued together from the support belt (4). The gluing material is applied directly to the surface (910) of the skins (91) prior to coupling skins to the embellishing film (6).

10 Claims, 3 Drawing Sheets

PROCESS FOR THE EMBELLISHMENT OF SKINS AND INSTALLATION FOR CARRYING OUT THE PROCESS

FIELD OF THE INVENTION

The present invention relates to a process for embellishing skins, preferably splits or regenerated leather, and an apparatus for carrying out the process.

BACKGROUND OF THE INVENTION

The skins which are commonly used in the clothing, furnishing and shoe fields are frequently prepared by means of a process of embellishment of the splits. It is well known that this process consists essentially of depositing a polyurethanic film on top of a support belt which has an embossed surface and then gluing to the polyurethanic film a split. In this manner there is obtained a skin which has the softness of the split and on the grain side the design of the embossment impressed on the polyurethanic film which characterizes the aesthetic appearance.

This process of embellishing is widely used because it permits to achieve skins which have softness and are pleasant to the touch comparable to the fine grain skins with the advantage that compared with the latter, they are substantially less expensive.

The apparatuses which are used for the embellishment of the skins are installations which are in continuous operation and which essentially comprise a pair of cylinders disposed one upstream and another downstream of the installation and a continuous belt which is made to travel between the two cylinders. This continuous belt which has an embossed surface goes through one or more groups for applications provided with systems of rollers, doctor systems or spraying systems which deposit on the embossed surface of the belt a thin layer of the polyurethanic material. There is obtained in this manner a thin elastic film which has impressed the design of the embossing of the continuous belt and which will constitute the embellishing film which, when applied on the split, will constitute the fine grain side. Downstream of the above application groups there is used a drying oven where the polyurethanic film is dried prior to entering a further application group in which roller systems or the doctor systems or spraying systems cover the surface of the embellishing film with a gluing substance.

After the application of the glue, conveying systems are used for the application of the splits to the embellishing film to which splits adhere due to the adhesive action of the glue which has been deposited previously together with the compression action exerted by a press or a colander disposed downstream of the application group of the glue.

After the colander, the split and the embellishing film which adheres to it enter into a dryer in which the drying of the glue ensures the stable adhesion between the split and the embellishing film. After the drying oven a skin obtained in this manner is separated from the continuous belt. The skin presents the fine grain side with the appearance and the design which the embossment in the continuous belt has impressed in the embellishing film.

Independently from the fact that the installations used to achieve the embellishment of the skin are provided with groups for the application of the embellishing film of a coating type or may be with a doctor system or with a spraying system or by means of rollers, all of them carry out the same process which consists essentially of forming the embellishing polyurethanic film on a continuous support belt and depositing on this embellishing film a layer of glue and causing the adherence of the skin to the embellishing film.

This procedure, however, offers some drawbacks. The first drawback consists of the fact that the deposit of the gluing material on the entire surface of the embellishing film deposited on the support belt involves a useless waste of the gluing material and therefore an increase in the cost which is not justified. In fact, the known process involves the deposit of the gluing material on the entire continuous surface of the embellishing film and therefore also on that part of the film which will not be involved subsequently in the application to the split and which at the end of the operation will constitute the scrap which will be discarded. If one considers that the scrap which is produced is in substantial amount, one will realize that the waste of gluing material and the cost which is involved are really high, particularly because this gluing material is particularly expensive.

Another drawback of the known process resides in the fact that the embellishing film presents the surface which must adhere to the split substantially smooth and it is not always possible to obtain perfect adherence of the skin to the embellishing film when they are coupled. In fact, when a sufficiently thick layer of gluing material has not been applied on the embellishing film, it may happen that the gluing material is completely absorbed by the split which has a porous surface and is very highly absorbent. If this happens, it may occur that on the final product, there are areas which are poorly glued and in which the separation of the embellishing film may happen. This event which is damaging by itself on the final embellished skin becomes even more serious if it occurs on the final product which is made from these skins such as shoes, bags, clothing articles, furnishing articles and similar articles because the final article is being discarded with substantial requirements of indemnification on the part of the client.

SUMMARY OF THE INVENTION

The present invention overcomes all the drawbacks mentioned hereinabove.

Particularly one of the objects of the invention is to provide a process for the embellishment of the skins which is more economical than the known processes and which still give a final product of equal quality.

Another object of the present invention is to provide a process which gives a greater adhesion between the embellishing film and the skin which is applied to the film.

The above objects are achieved by providing a process for the embellishment of the skins which comprises the following operations:

application on the surface of a continuous support belt of at least one layer of an elastic material capable of providing an embellishing film;

drying the embellishing film which has been disposed on the continuous support belt;

coupling the skins with the embellishing film after application of at least one layer of gluing materal capable of ensuring the reciprocal adherence between the skins and the embellishing film;

application of pressure to the skins and the embellishing film which have been coupled together in order to obtain the reciprocal gluing together;

separation of the skins and the embellishing film which have been glued together from the continuous support belt.

The process is further characterized by the fact that at least one layer of the gluing material is applied directly on the surface of the skins prior to putting the skins together with the embellishing film.

The installation which is used to carry out the process is characterized by the fact that it comprises:

a first cylinder placed at the beginning of the cycle of operation and which cooperates with a second cylinder located at the end of the same cycle, the two cylinders being capable of winding and/or unwinding the same support belt which is extended between them;

one or more groups for the application of one or more layers of elastic material on the support belt capable of providing the embellishing film;

at least one group for drying the embellishing film which has been deposited on the continuous belt, each one of the drying groups being placed downstream with respect to a corresponding application group of the same elastic material;

at least one group for the application of at least one layer of gluing material on the skins;

conveying means capable of achieving the coupling of the skins with the embellishing film;

at least one group for the application of pressure on the skins and on the embellishing film which have been coupled together;

at least one discharge station for the separation of the skins and the embellishing film which has been glued to them from the continuous support belt.

According to a preferred embodiment the installation for the purpose of embellishing the skins according to the process according to the invention provides that the application of the elastic material which forms this embellishing film on the continuous underlying support belt and the application of the gluing material on the surface of the skins are carried out by transfer with rollers. In particular, the roller which deposits the gluing material has a rough surface and during the deposit of the glue, it exerts on the skin a slight abrasive action thus favoring the penetration of the glue itself whereby a greater adherence between the skin and the embellishing film is obtained in the final article.

BRIEF DESCRIPTION OF THE DRAWINGS

The object and the advantages according to the present invention are described in some detail with reference to the accompanied figures of which.

Figure 1:
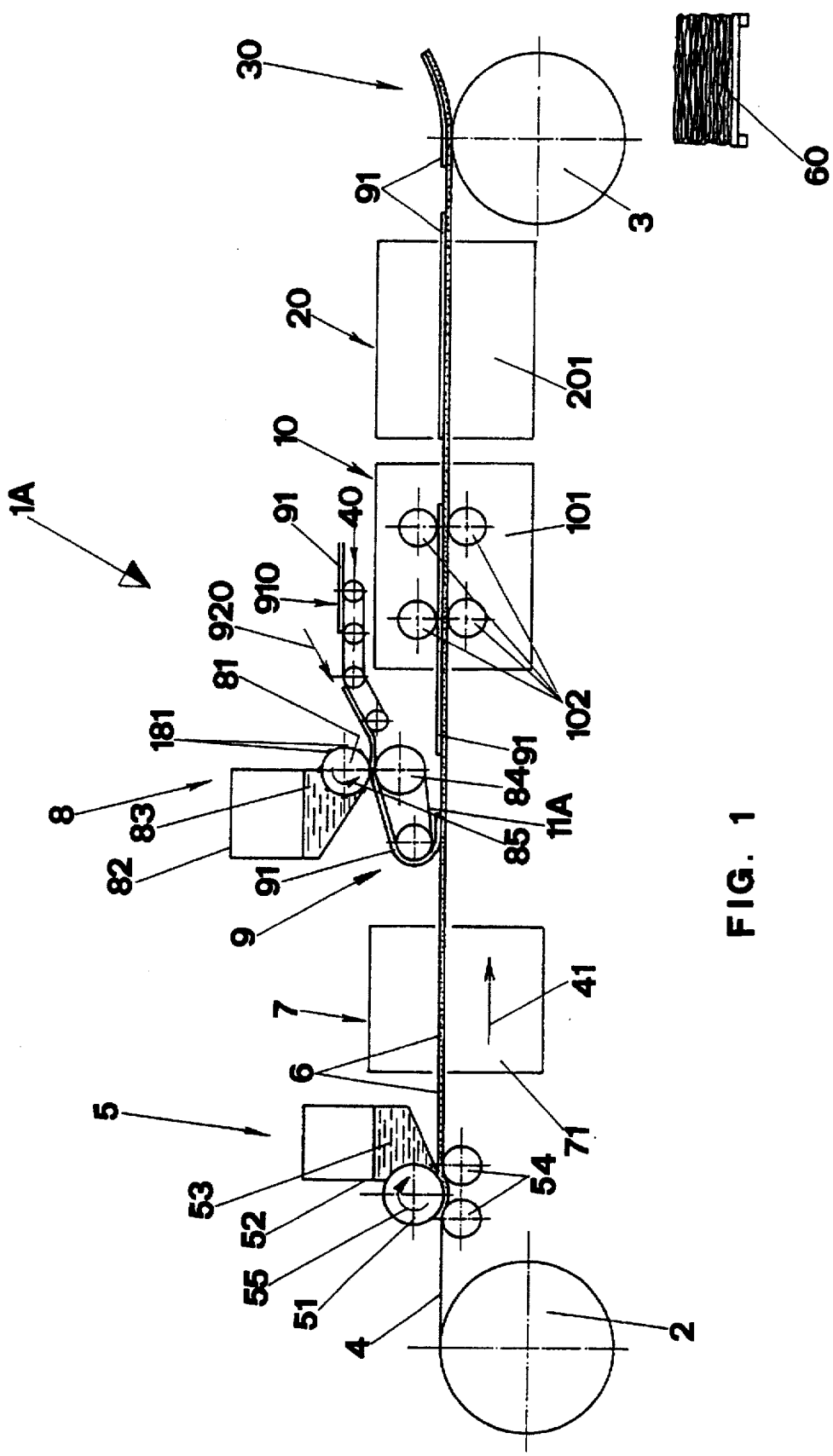
FIG. 1 shows the installation used to carry out the process according to the present invention according to a first embodiment.
Figure 2:
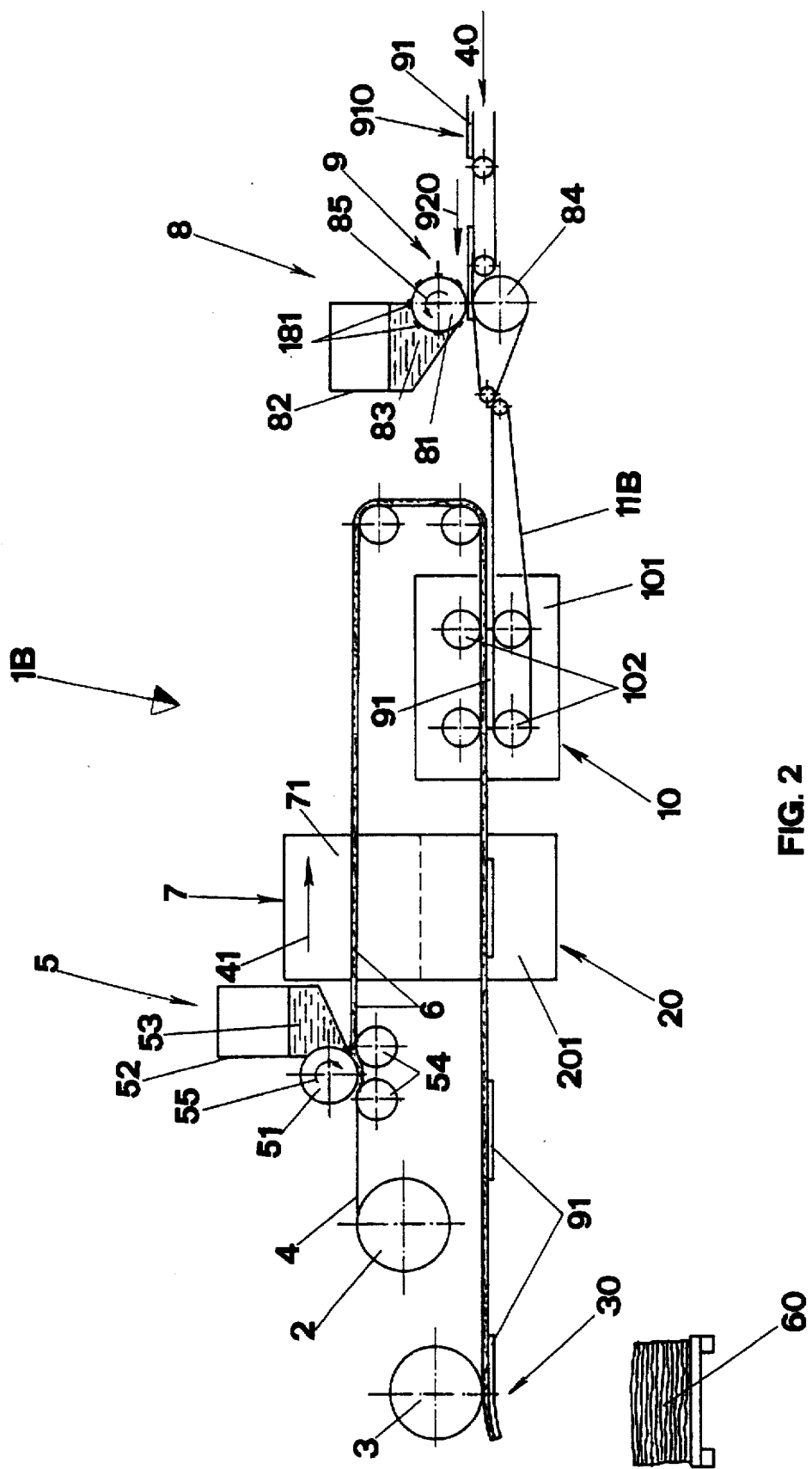
FIG. 2 shows the installation used to carry out the embellishing process according to the present invention and specifically according to a second embodiment.

The process according to the invention is described by reference to the two embodiments of the installation shown in FIGS. 1 and 2 in which the symbol 1A designates the installation according to FIG. 1 and the symbol 1B is used to designate the installation according to FIG. 2 both of which constitute an object of the present invention.

Both installations comprise:

a first cylinder 2 and a second cylinder 3 which are located respectively at the beginning and at the end of the operation cycle of the installation with the support belt 4 being wound and/or unwound between the two cylinders;

a group 5 for the application on the support belt 4 of an elastic material capable of forming an embellishing film 6;

a drying group 7 being located downstream of the application group 5 and which comprises oven 71;

a group 8 for the application of gluing material on the surface of the skins 91;

conveying means 9 for locating the skins 91 on the embellishing film 6;

a pressure group constituted by colander 101;

a drying group 20 constituted by dryer 201 which may be of the independent type as shown in the first embodiment 1A or may be combined with the preceding drying group 7 according to the second embodiment of the invention 1B;

a station 30 for the removal of the product being formed.

The arrangement of the groups described hereinabove obviously has been provided merely for the purpose of illustration because the groups which carry out the application of the products may be more than one for each type of the product being deposited. Further each installation may comprise any number of dryers and presses.

In addition, between the several groups there may also be located further devices or apparatuses capable of achieving the particular effects on the embellishing film which has been deposited or on the skin being applied to the film or on the final article.

With respect to group 5 it should be noted that this group is located downstream with respect to the first cylinder 2 and comprises application cylinder 51 which is located above the support belt 4 and at least a pair of countercylinders 54 located on the opposite side of the support belt 4. The support belt 4 travels being extended between cylinders 51 and 54 and receives on its surface the deposit of the elastic material 53 which is contained in the container 52 in which there is placed the application cylinder 51.

Figure 3:
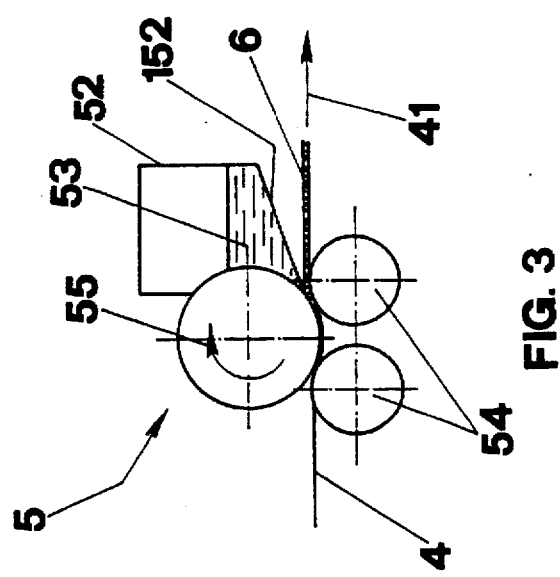
FIG. 3 shows the detail of the group for the application of the elastic material to the support belt which is used in both installations according to FIG. 1 and FIG. 2.

The material 53 which is contained in the container 52 consists preferably of a polyurethanic resin in an aqueous solution and catalyzing substances. As shown in FIG. 3 this material is placed on the support belt 4 when the latter travels in the direction 41 due to the action of the application cylinder 51. In particular, it is noted that the application cylinder 51 rotates in clockwise direction 55 and therefore in a direction contrary to the direction of travel 41 of the support belt 4. In this manner, there is obtained on the latter a controlled deposit of the elastic material 53 due to the presence of the scraping blade 152 of the container 52 which cooperates with the application cylinder 51.

Figure 4:
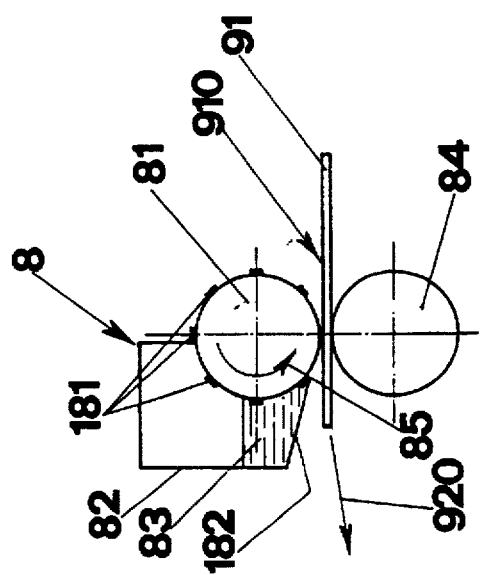
FIG. 4 illustrates the group used for the application of the gluing material to the skins which is used in both embodiments according to FIGS. 1 and 2.

Downstream of the application group 5 the elastic material 53 forms an embellishing film 6 on the support belt 4, the film 6 being then dried by passing through the drying group 7. The latter is constituted by oven 71 in a manner that the film is solidified when it reaches the second application group which is indicated overall by numeral 8 and which is shown also in FIG. 4.

Also the application group 8, similarly to application group 5 which has been described hereinabove, comprises an application cylinder 81 which is located in container 82 which contains the gluing liquid material 83.

Underneath the application cylinder 81 there is placed countercylinder 84 which serves as support for the skins 91, the latter being conveyed by group shown overall with numeral 40 and which is located above the belt.

Each skin 91 travels along the direction 920 and the upper surface 910 comes in contact with the application cylinder 81. The latter rotates according to the counterclockwise direction 85 and therefore in a direction contrary to the direction of travel of the skins 91, in this manner also for the purpose of achieving a controlled distribution of the gluing liquid material 83. The controlled distribution of the gluing materal 83 is favored by the presence of the scraping blade 182 of container 82 which cooperates with the application cylinder 81.

The application surface of the cylinder 81 is provided with roughness 181 which exerts on the surface 910 of skin 91 a slight abrasive effect which favors the penetration of the gluing material. In this manner one obtains an ideal penetration of the gluing material into the surface 910 of the skin 91 which guarantees a greater adhesion of the skin itself to the embellishing film 6 after the coupling thus avoiding on the final article the possibility of reciprocal separation between the embellishing film and the skin. At the exit from the application group 8 the skin 91 through conveying means 9 is coupled to the embellishing film 6 by turning against it the surface 910 on which is placed the gluing material. It should be noted that the conveying means 9 in the first embodiment of the invention according to FIG. 1 are constituted by a conveying belt 11A which functions with a traveling speed greater with respect to the traveling speed of the support belt 4 which is located under it while in the second embodiment of the invention the conveying means are constituted by transporting belt 11B as shown in FIG. 2 which functions with a traveling speed equal to the traveling speed of the support belt 4 which is located above it. The continuous travel of the support belt 4 in the direction 41 introduces the skin 91, coupled to the embellishing film 6 in the interior of the pressure group 10 which is constituted by colander 101 which is provided with a plurality of counterposed pressure cylinders 102, the latter favoring due to pressure the close adherence between the skin and the embellishing film. The stability of this adherence is then perfected in the drying group 20 which is constituted by dryer 201 in the interior of which the skin and the embellishing film are introduced due to the continuous travel of the support belt 4 on which they are placed.

At the exit of dryer 201 the skin 91 which at that stage is anchored to the embellishing film 6 in a stable manner and therefore has been embellished, reaches the discharge station 30 where one or more workers provide for separating the skin from the traveling belt 9. The skin which has been embellished is superimposed to other skins which have been previously removed and placed on top of a pallet 60 or other support means such as for instance a similar stand or similar device.

It is clear that corresponding to the discharge station 30 the embellished skins may be removed from the traveling belt 4 and may be placed stacked on the pallet 60 or a stand or similar supporting devices by means of a robot or other automatic means of any type.

On the basis of what has been described hereinabove, it is clear that the process according to the present invention and the installation which is being used permit to achieve the stated objects. First of all, the process and the installation of the invention permit to obtain the same production which has been obtained with known installations by employing a smaller amount of the gluing material. In fact, in the installation according to the present invention, only the surface 910 of skin 91 which is caused to adhere to the embellishing film is coated with the gluing material and it is clear that one obtains a saving of the corresponding amount of the gluing material which in the known installation on the contrary has been wasted because it has been distributed on the entire surface of the embellishing film and therefore also in that part of the embellishing film which constitutes the discard during the operation.

Further also the object of obtaining a better adherence between the skin and the embellishing film is achieved. In fact, as already stated, the application cylinder 81 of the gluing material 83 has its lateral surface provided with roughness 181 and rotates according to direction 85 which is contrary to the traveling direction 920 of the skin 91 so that one contemporaneously achieves a controlled distribution of the gluing material 83 and a slight abrasive action on the surface of the skin which improves the absorption and the close contact with the gluing material.

The installation according to the invention may also assume configurations different from the two embodiments described hereinabove because it may be provided with any number of application stations of the polyurethanic material on the support belt and each one of them may be followed by one or more stations which may carry out the drying, the application of pressure or other operation having the purpose of applying on the embellishing film particular properties, designs or others.

Also with respect to the application of the gluing material this operation may be carried out in more than one phase and one or more application stations depending upon the requirements of the client. Eventually some modifications of the installation with respect to the installation of different number of stations different from the one described hereinabove are still permissible and are intended to be protected by the present invention.

What is claimed is:

1. A process for the embellishment of skins (91) which comprises the steps of:
   1) applying on the surface of a continuous support belt (4) at least one layer of an elastic material capable of forming an embellishing film (6);
   2) drying said embellishing film (6) disposed on said continuous support belt (4);
   3) applying at least one layer of gluing material (83) to said skins (91) and exerting an abrasive effect on said skins whereby said gluing material penetrates into said skins;
   4) coupling said skins with said embellishing film (6)
   5) applying pressure on said skins (91) and said embellishing film (6) coupled between themselves in order to improve the adherence between said skins and said embellishing film;
   6) drying said skins coupled with said embellishing film;
   7) separating said skins (91) and said embellishing film (6) which have been dried from said continuous belt (4).

2. An installation for embellishment of skins (91) which comprises:
   a) a first cylinder (2) located at the beginning of said installation and cooperating with a second cylinder (3) located at the end of said installation, a continuous support belt (4) being wound and unwound between said first and second cylinders;
   b) at least one station (5) for the application on said continuous support belt (4) of at least one layer of elastic material capable of forming an embellishing film (6), said station (5) including at least one pair of countercylinders (54) supporting said continuous support belt (4), a container (52) containing an embellishing elastic material (53), and at least one application cylinder (51) contacting said embellishing elastic material (53) for the application of said embellishing film (6), said application cylinder (51) pressing said countercylinders (54);

c) at least one drying station (7) for drying said embellishing film (6) deposited on said continuous support belt (4), said drying station (7) being located downstream with respect to said station (5) for the application of said layer of elastic material;

d) at least one station (8) for the application of at least one layer of gluing material on said skins (91), said station (8) including a container (82) containing gluing material (83), a countercylinder (84) supporting said skins (91), an application cylinder (81) located above said countercylinder (84), said application cylinder (81) contacting said gluing material (83) and applying said gluing material on said skins (91), said application cylinder (81) having a lateral surface provided with roughness (181) for exerting an abrasive effect on the skins whereby the gluing material penetrates into the skins;

e) conveying means (9) for locating said skins on which glue has been applied on said embellishing film (6) and coupling said skins with said embellishing film;

f) at least one station (10) for the application of pressure on said skins (91) and said embellishing film (6) which have been coupled between themselves; and g) at least one discharge station (30) for the separation of said skins (91) and coupled embellishing film (6) which has been glued thereto from said continuous support belt (4).

3. The installation according to claim 2 wherein each pressure station (10) is followed by at least one drying station (20).

4. The installation according to claim 3 wherein each drying station (7; 20) is constituted by a drying oven (71; 201).

5. The installation according to claim 2 wherein said conveying means (9) comprises conveying belt (11A), said cylinders (11) guiding said skins (91) which have the surface thereof glued, turned towards said embellishing film (6).

6. The installation according to claim 2 wherein each of said pressure stations (10) is constituted by at least one calender (101).

7. The installation according to claim 2 wherein said continuous support belt (4) has a surface thereof, said surface having an embossing, said surface being in contact with said embellishing film (6).

8. The installation according to claim 2 wherein said continuous support belt (4) travels from said cylinder (2) to said cylinder (3) in one direction and said application cylinder (51) rotates with a direction (55) opposite to the direction of travel (41) of said belt (4).

9. The installation according to claim 2 wherein said skins (91) travel in one direction (920) and said application cylinder (81) rotates with a direction (85) opposite to said direction (920) of the travel of said skins (91).

10. The installation according to claim 2 wherein each of said containers (52, 82) is of the type having a scraping blade (152, 182), said scraping blade cooperating with each of said application cylinder (51, 81).

* * * * *